May 16, 1933.  W. NOBLE  1,909,592
THERMOSTATIC CONTROL
Filed Sept. 12, 1929
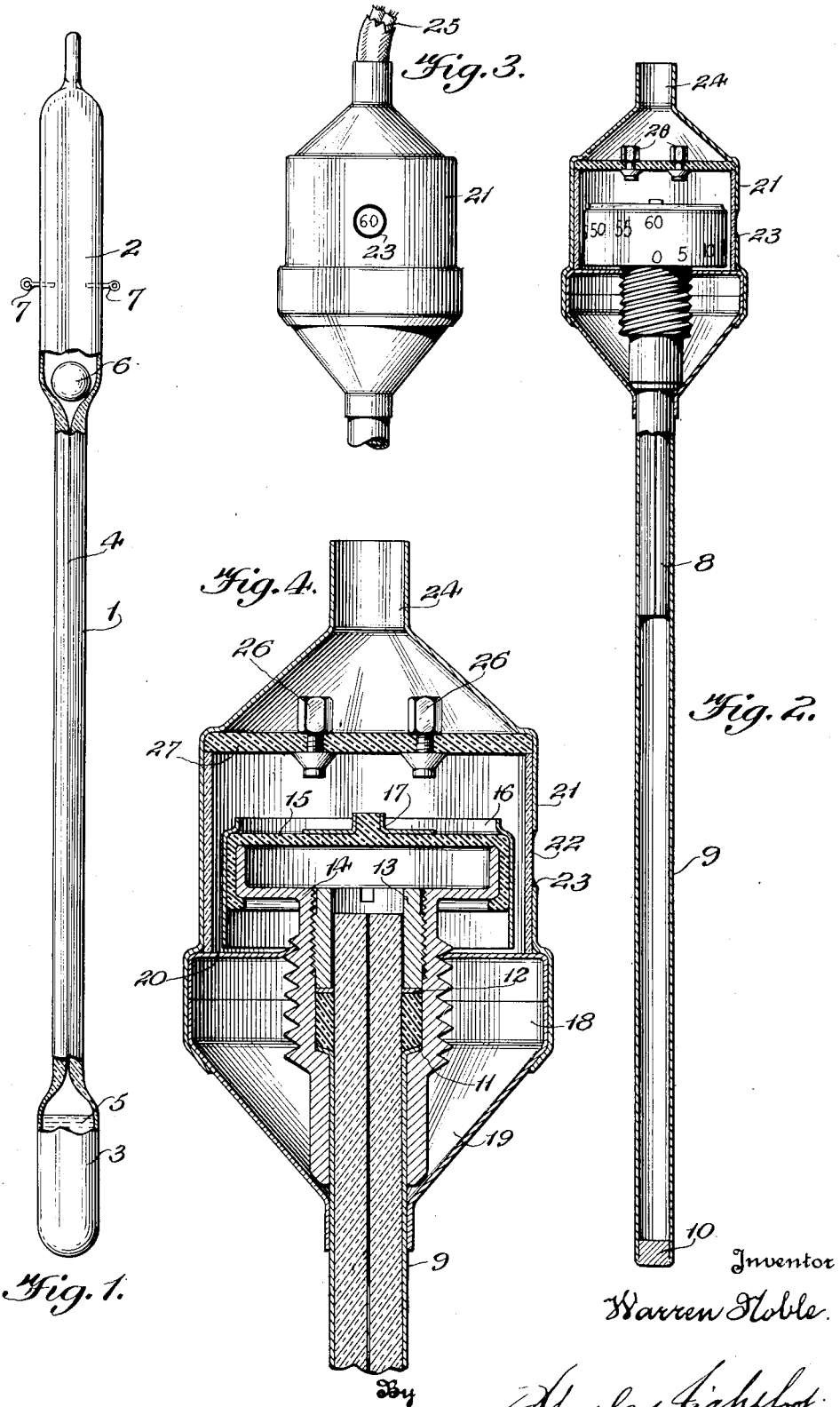
Inventor
Warren Noble.
By
Stanley Lightfoot
Attorney Patented May 16, 1933

1,909,592

UNITED STATES PATENT OFFICE

WARREN NOBLE, OF DETROIT, MICHIGAN, ASSIGNOR TO ELECTROMASTER, INC., OF DETROIT, MICHIGAN, A CORPORATION OF MICHIGAN

THERMOSTATIC CONTROL

Application filed September 12, 1929. Serial No. 392,154.

This invention relates to thermostatic control for the heating of substances and is evidently adapted for incorporation in an organization such as that described in my copending application, Serial No. 369,110 filed June 7, 1929, whereas thermostatic control of the heating of the cooking utensils on the cooking table of a range is described, the purpose of the present control being to provide for the discontinuance of the source of heat at a predetermined time after a desired temperature has been reached and the substance being heated, and more particularly the invention aims to provide means for determining the length of time the substance may be maintained at a boiling temperature.

In the boiling of potatoes or other vegetables or the preparation of stews, for instance, there is a substantially definite time that the boiling should be continued in order to produce the best cooking, and beyond this time, the cooking depreciates. It is, therefore, highly desirable that this length of time being known, the boiling should be discontinued at its expiry and it is not always convenient that the usual timing clock or similar device be used for such purpose as in the case of well known oven thermostats and timing devices, as in the first place these call for fixed installation and are not portable for insertion in the usual utensil used in cooking as on the cooking table of a stove and are moreover governed by the general temperature within an enclosure as distinguished from the temperature of the substance being cooked as far as temperature control is concerned, and are usually timed from the commencement of the application of heat instead of from the time of certain temperature in the substance being cooked is concerned. In other words, they are not automatic as to the commencement of the timing.

It is, therefore, an object of this invention to provide a thermostatic heat regulator which will be automatic both as to commencement and completion of timing, the commencement of the timing operation being subject to the attaining of a predetermined temperature by the substance being heated.

As related to the boiling of a substance, it is an object of the invention to provide a device which may be inserted in the substance or subjected to the heating of the substance and which may be utilized to control a circuit through means heating or in turn controlling the heating of substances in a manner causing the heat to be shut off from the substance at a predetermined time after the boiling of the said substance has commenced.

Still further it is an object of this invention to provide a device in which the time interval between the commencement of the boiling and the eventual shutting off of the heat may be varied at will to suit requirements.

Still further objects and advantages subsidiary or incidental to the aforesaid objects, or resulting from the construction or operation of the invention as it may be carried into effect, will become apparent as the said invention is hereinafter further disclosed.

Figure 1 is a side elevation of my improved thermostat, partially broken away for purposes of explanation;

Figure 2 is a vertical sectional view through a modified form of the device shown in Figure 1;

Figure 3 is a side elevation of the top of the device of Figure 2; and

Figure 4 is an enlarged view of a vertical section taken centrally through Figure 3.

1 refers to a tubular element having enlarged end portions 2 and 3 in communication by means of a restricted passageway 4. In the bottom portion 3 is a quantity of liquid 5 while in the top portion 2 is a floatable ball 6 adapted to act as a circuit closing means between two electrical terminals 7 integrally embedded in and extending in each direction through the sidewalls of the top portion 2 at such times as sufficient fluid may be provided in the upper portion to cause flotation to the required height.

Such a thermostat is adaptable to a wide variety of uses, however, since it finds particular use in the art of cooking. Its operation will herein be more particularly described in connection with the heating of water and watery substances. The liquid 5 is chosen with particular regard to its boiling point which in the present instance must be substantially below the boiling point of water and may be benzene or carbon tetrachloride. The lower end 3 containing this fluid is inserted into a port or other receptacle containing the water or matter being cooked while the upper portion 2 projects outwardly thereof for subjection to cooler temperatures. As the temperature of the substance being cooked rises and the boiling point of the fluid in the bottom 3 attains its boiling point, the vapor therefrom rises through the passage 4 and passes into the upper end 2 whereupon it condenses and floats the ball 6. It will be evident that as soon as sufficient liquid shall have risen in the upper end 2 to raise the ball to the terminals 7 a circuit is established therethrough which in turn may be employed to perform such duties as starting a motor to curtail or shut off the supply of heat to the substance being cooked. It will also be evident that a definite time element between the beginning of the boiling of the fluid 5 and the closing of the circuit is involved. This time element is controlled by the size of the passage 4 and the height through which the ball 6 must be raised. I have found it preferable to make this passage of capillary dimensions and to regulate the height of the terminals for a desired time, as for example, three minutes.

In the remaining figures is shown a form which is slightly different in operation and which readily lends itself to a change of the time element as desired. The numeral 8 refers to a tube, also preferably of internal capillary dimensions having a casing 9 therearound which extends substantially below the tube 8 and is closed at its outer or lower end 10. The casing ends at its upper end prior to surpassing the end of the tube 8 and is flared to receive a packing ring 11 and a washer 12 for abutment against a threaded extension 13. Snared against the flared end of the casing 9 and the threads of the extension 13 is an externally threaded member having an enlarged open end 14 which in part comprises the upper end portion of the device and hence the condenser for the liquid evaporated in the bottom of casing 9. A flexible cup 15 of insulating material such, for example, as rubber tightly fits over the end of the upper end 14 and is held thereon by a suitable ring 16. A metallic plate 17 is carried centrally of the flexible top 15 for a purpose to become hereinafter apparent.

Surrounding the member 14 is an enclosure 18 which is an assembly comprising a lower portion 19 converging downwardly to closely and slidably fit the casing 9. The upper end of this portion is turned directly inwardly at 20 to terminate in close fitting relation with the threaded portion of member 14 whereby upon rotation there will be relative longitudinal displacement in proportion to the degree of rotation imparted thereto.

Attached to the converging portion 19 is an upstanding portion 21 preferably carrying a transparent lining 22 internally thereof and having a window 23 for a purpose to appear hereinafter. The portion 21 converges at its outer end to a neck portion 24 of sufficient diameter to receive electric lead lines 25 which are attached to terminal posts 26. These posts are supported in a plate 27 made of insulating material which may be snared between the transparent lining 22 and the portion 21 as shown. It is apparent that the enclosure 18 forms a dustproof cover for the condenser and for the threaded portions and likewise renders the device of neat appearance. Further, since rotation of the enclosure with respect to the casing 9 brings about relative longitudinal displacement of the parts, an adjustment of the distance between the plate 17 and the terminals can be effected in an exact manner and I, therefore, calibrate the instrument and place markings on the part 16 in such manner as to be visible through the window 23 as will now be explained.

That part of the casing 9 which extends below the tube 8 together with tube 8 and the condenser 14 is substantially or totally filled with fluid having a lower boiling point than the boiling point of water as hereinbefore explained with reference to Figure 1. The bottom of the casing 9 is inserted into a watery substance subjected to heating and as soon as the boiling point of the fluid has been reached a pressure will be set up forcing the flexible end 15 outwardly and carrying the plate 17 to the terminals 26 for establishment of a circuit therethrough. This circuit may control the operation of an electric motor which in turn may be employed to curtail the supply of heat to the matter being cooked. It is therefore apparent that the markings on the member 16 may represent minutes elapsed between the beginning of boiling of the fluid and the establishment of the circuit.

It is obvious from these two modifications that rather wide departure may be made from the design without departing from the spirit of my invention and I, therefore, desire to be limited in the interpretation and application of my invention only by the scope of the appended claims.

What I claim is:

1. In a thermostat, an elongated container having a top and bottom of substantial cubic displacement joined by a restricted central portion, the bottom at least of said container containing liquid and adapted for insertion into matter subjected to heating, the top of said container being sufficiently spaced from said bottom to be well above the matter being heated, the liquid in said bottom upon evaporation under heating rising and condensing in said top, and means carried by said top adapted to be displaced by the presence of liquid in said top, said last-named means upon displacement performing work.

2. In a thermostat, an elongated container comprising a tubular member having enlarged ends adapted to contain fluid, one of said ends being insertable into matter subjected to heat, the other of said ends extending well outwardly of said matter, said tubular member having capillary dimensions whereby vapor arising from the heated end will pass into the cool end for condensation, and means subject to the presence of fluid in the cool end for establishing an electrical circuit.

3. In a thermostat, a tubular member containing liquid in at least one end thereof and having an elongated central portion of restricted cross-sectional area, one end of said member being adapted for insertion into a fluid subjected to heating, whereby the vapor arising from said fluid upon attainment of a boiling temperature rises upwardly through said central portion, the upper end of said tubular member comprising a condenser for the vapor ascending thereto through said central portion, means operative under the influence of a predetermined quantity of fluid in said upper end for closing an electrical circuit, and manually operable means for determining the quantity of fluid to be evaporated by said upper end prior to closing said circuit.

4. In a thermostat, a fluid container and a condenser connected in substantially spaced relation by a tube of capillary dimensions, said condenser having an extensible wall, having a conductor plate attached thereto, electrical terminal carrying means supported in spaced relation with respect to said wall, said wall distending under the influence of the presence of fluid under the pressure of fluid when evaporated under heating in said container, said wall upon distension by a predetermined amount being effective to move said plate into engagement with said electrical terminals and close a circuit therethrough.

5. In a thermostat, a tubular structure having a portion of capillary dimensions and ends of enlarged dimensions and containing liquid substantially to its capacity, one end of said tube being adapted for insertion into a watery substance subjected to heating, the other end of said tube comprising a condenser and having a flexible top wall of insulating material, said top wall carrying an electrical conductor plate, said flexible top wall distending under the influence of fluid pressure in said condenser resulting from evaporation of said liquid in the bottom of said tube, an electrical terminal carrying means supported in spaced relation with respect to said condenser, said wall upon distension by a predetermined amount being effective to move said conductor plate into engagement with said terminals and close a circuit therethrough and manual means for regulating the normal distance between said conductor plate and said terminals for varying the time element between the beginning of evaporation of said fluid and the closing of said circuit.

6. In a thermostat, a tubular structure having a portion of capillary dimensions and ends of enlarged dimensions and containing liquid substantially to its capacity, one end of said tube being adapted for insertion into a watery substance subjected to heating, the other end of said tube comprising a condenser and having a flexible top wall of insulating material, said top wall carrying an electrical conductor plate, said flexible top wall distending under the influence of fluid pressure in said condenser resulting from evaporation of said liquid in the bottom of said tube, a housing for said condenser supported thereby and electrical terminals carried by said housing, said wall upon distension a predetermined amount being effective to move said plate into engagement with said terminals and close a circuit therethrough, said housing being displaceable to vary the distance between said terminals and said plate to vary the time element between the beginning of evaporation by said liquid under heating and the closing of said electrical circuit.

7. In a thermostat, a tubular structure having a portion of capillary dimensions and ends of enlarged dimensions and containing liquid substantially to its capacity, one end of said tube being adapted for insertion into a watery substance subjected to heating, the other end of said tube comprising a condenser and having a flexible top wall of insulating material, said top wall carrying an electrical conductor plate, said flexible top wall distending under the influence of fluid pressure in said condenser resulting from evaporation of said liquid in the bottom of said tube, a housing for said condenser carrying electrical terminals, said wall upon distention a predetermined degree being effective to move said plate into engagement with said terminals for establishing a circuit therethrough, means for adjusting said housing with respect to said condenser to vary the distance between said plate and said terminals, and an indicator carrying graduations calibrated with respect to time whereby a given setting in minutes between the beginning of evaporation and the closing of said circuit may be effected at will.

8. In a thermostat, a tubular structure having a portion of capillary diameter connecting enlarged end portions, both of said end portions containing fluid having a boiling point substantially below the boiling point of water, the lower portion of said tube being adapted for insertion in a watery substance subjected to cooking, the upper portion of said tube having a top wall yieldable under pressure, said top wall being composed of insulating material and having a conductor plate mounted thereon, a casing around said upper portion carrying electrical terminals in operative relation with said conductor plate to establish a circuit therebetween, said casing being adjustable longitudinally of said tube to vary the normal distance between said conductor and said terminals to vary the time element between the beginning of evaporation of the fluid in said lower portion and the closing of said electrical circuit.

9. In a thermostat, a glass tube of internal capillary dimensions, an elongated casing fitting externally around said tube and extending therebeyond at one end, said casing having an enclosure at its extended end, a housing around the upper end of said tube attached to said casing in rigid relation, said housing comprising rigid upstanding sidewalls and a yieldable top, an electrical conductor carried by said top outwardly thereof, an enclosure for said housing carried by said tube and longitudinally adjustable therewith, electrical terminals carried by said enclosure in operative relation with said conductor, said casing, said tube and said housing being filled with a fluid of lower boiling point than the boiling point of water whereby subjection to temperatures approaching the boiling temperature of water evaporates the fluid in said casing and expands the yieldable wall of said housing, said wall under distension being effective to move said conductor into engagement with said electrical contacts to establish a circuit therethrough, said enclosure upon adjustment varying the distance between said electrical contacts and said conductor to vary the time element between the beginning of evaporation of said fluid and the closing of said circuit, graduations on said housing and a window through said inclosure through which the desired graduations may be visually chosen to predetermine the time of establishment of said circuit.

10. As an article of manufacture, a thermostat comprising a fluid container, a condensing chamber connected to said container for receiving vapor therefrom and means associated with said chamber operable on the vapor condensed in the chamber for performing work.

In testimony whereof I affix my signature.

WARREN NOBLE.